US012666522B2

(12) United States Patent
Tang et al.

(10) Patent No.: US 12,666,522 B2
(45) Date of Patent: Jun. 23, 2026

(54) NEUTRON GENERATION USING PYROELECTRIC CRYSTALS

(71) Applicant: Lawrence Livermore National Security, LLC, Livermore, CA (US)

(72) Inventors: Vincent Tang, Dublin, CA (US); Glenn A. Meyer, Danville, CA (US); Steven Falabella, Livermore, CA (US); Gary Guethlein, Livermore, CA (US); Brian Rusnak, Livermore, CA (US); Stephen Sampayan, Manteca, CA (US); Christopher Spadaccini, Oakland, CA (US); Li-Fang Wang, Livermore, CA (US); John Harris, Monterey, CA (US); Jeff Morse, Westhampton, MA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 310 days.

(21) Appl. No.: 18/376,396

(22) Filed: Oct. 3, 2023

(65) Prior Publication Data

US 2024/0080965 A1 Mar. 7, 2024

Related U.S. Application Data

(62) Division of application No. 17/122,918, filed on Dec. 15, 2020, now Pat. No. 11,839,016, which is a (Continued)

(51) Int. Cl.
*H05H 3/06* (2006.01)
*G21G 4/02* (2006.01)

(52) U.S. Cl.
CPC ................. *H05H 3/06* (2013.01); *G21G 4/02* (2013.01)

(58) Field of Classification Search
CPC .................................. G21G 4/02; H05H 3/06
See application file for complete search history.

(56) References Cited

U.S. PATENT DOCUMENTS 3,860,827 A 1/1975 Cranberg
4,906,896 A 3/1990 Swenson
(Continued)

FOREIGN PATENT DOCUMENTS

WO 2006086090 A2 8/2006
WO WO-2012030131 A2 * 3/2012 ............... G21G 4/02

OTHER PUBLICATIONS

Supplmental Notice of Allowance from U.S. Appl. No. 15/279,214, dated Feb. 9, 2021.

(Continued)

*Primary Examiner* — Sharon M Davis
(74) *Attorney, Agent, or Firm* — Zilka-Kotab, P.C.

(57) ABSTRACT

A method for producing a neutrons includes triggering a raising or a lowering of a temperature of a pyroelectric crystal of less than about 40° C. to produce a voltage of negative polarity of at least −100 keV on a surface of a deuterated or tritiated target coupled thereto. A deuterium ion source is pulsed to produce a deuterium ion beam. The accelerating of the deuterium ion beam is achieved by accelerating voltage of the pyroelectric crystal toward the deuterated or tritiated target to produce neutrons. Furthermore, the pyroelectric crystal, the deuterated or tritiated target, and the deuterium ion source are coupled to a common support. The method also includes throwing the common support housing the pyroelectric crystal, the deuterated or tritiated target, and the deuterium ion source near an unknown threat for identification thereof.

7 Claims, 4 Drawing Sheets

Related U.S. Application Data division of application No. 15/279,214, filed on Sep. 28, 2016, now Pat. No. 11,019,717, which is a division of application No. 12/540,203, filed on Aug. 12, 2009, now Pat. No. 9,723,704.

(60) Provisional application No. 61/088,310, filed on Aug. 12, 2008.

(56) References Cited

U.S. PATENT DOCUMENTS

| | | | |
|---|---|---|---|
| 9,723,704 | B2 | 8/2017 | Tang et al. |
| 11,019,717 | B2 | 5/2021 | Tang et al. |
| 2009/0135982 | A1 | 5/2009 | Groves |
| 2010/0061500 | A1 | 3/2010 | Lou et al. |
| 2011/0044418 | A1 | 2/2011 | Stubbers et al. |
| 2012/0106690 | A1 | 5/2012 | Tang et al. |
| 2017/0040075 | A1 | 2/2017 | Tang et al. |
| 2021/0227678 | A1 | 7/2021 | Tang et al. |

OTHER PUBLICATIONS

Restriction Requirement from U.S. Appl. No. 17/122,918, dated Sep. 16, 2022.
Non-Final Office Action from U.S. Appl. No. 17/122,918, dated Jan. 10, 2023.
Notice of Allowance from U.S. Appl. No. 17/122,918, dated Jul. 12, 2023.
Geuther et al., "Enhanced neutron production from pyroelectric fusion." Applied Physics Letters vol. 90, No. 174103, Apr. 23, 2007, 3 pages.
Lang, "Pyroelectricity: From Ancient Curiosity to Modern Imaging Tool," American Institute of Physics, Physics Today, Aug. 2005, pp. 31-36.
Naranjo et al., "Observation of nuclear fusion driven by a pyroelectric crystal" Nature Publishing Group, Nature, vol. 434, Apr. 28, 2005, pp. 1115-1117.
Geuther et al., "Nuclear Reactions Induced by a Pyroelectric Accelerator" The American Physical Society 2006, Physical Review Letters, Feb. 10, 2006, 4 pages.
Tang et al., "Neutron Production from Feedback Controlled Thermal Cycling of a Pyroelectric Crystal Stack," Lawrence Livermore National Laboratory, Review of Scientific Instruments, UCRL-JRNL-233604, Aug. 10, 2007, 15 pages.
Tang et al., U.S. Appl. No. 12/540,203, filed Aug. 12, 2009.
Restriction Requirement from U.S. Appl. No. 12/540,203, dated Sep. 26, 2012.
Non-Final Office Action from U.S. Appl. No. 12/540,203, dated Nov. 30, 2012.
Final Office Action from U.S. Appl. No. 12/540,203, dated Apr. 16, 2013.
Examiner's Answer to Appeal Brief from U.S. Appl. No. 12/540,203, dated Jan. 27, 2014.
Patent Board Decision on Appeal from U.S. Appl. No. 12/540,203, dated Jun. 27, 2016.
Notice of Allowance from U.S. Appl. No. 12/540,203, dated Jul. 7, 2016.
Tang et al., U.S. Appl. No. 15/279,214, filed Sep. 28, 2016.
Restriction Requirement from U.S. Appl. No. 15/279,214, dated Sep. 27, 2018.
Non-Final Office Action from U.S. Appl. No. 15/279,214, dated Mar. 7, 2019.
Non-Final Office Action from U.S. Appl. No. 15/279,214, dated Dec. 13, 2019.
Final Office Action from U.S. Appl. No. 15/279,214, dated May 19, 2020.
Notice of Allowance from U.S. Appl. No. 15/279,214, dated Aug. 3, 2020.
Notice of Allowance from U.S. Appl. No. 15/279,214, dated Dec. 7, 2020.
Tang et al., U.S. Appl. No. 17/122,918, filed Dec. 15, 2020.

* cited by examiner

NEUTRON GENERATION USING PYROELECTRIC CRYSTALS

RELATED APPLICATIONS

This application is a divisional application of U.S. patent application Ser. No. 17/122,918 filed Dec. 15, 2020, which is a divisional application of U.S. patent application Ser. No. 15/279,214 filed on Sep. 28, 2016, which is a divisional application of U.S. patent application Ser. No. 12/540,203 filed on Aug. 12, 2009, which claims priority to U.S. Provisional Patent Application No. 61/088,310 filed on Aug. 12, 2008. This application claims priority to the foregoing applications, each of which is also hereby incorporated by reference.

This invention was made with Government support under Contract No. DE-AC52-07NA27344 awarded by the United States Department of Energy. The Government has certain rights in the invention.

FIELD OF THE INVENTION

The present invention relates to pyroelectric crystals, and particularly, to the preparation of pyroelectric crystals for use in neutron interrogation systems.

BACKGROUND

The national security of the United States of America (USA), along with many other countries around the globe, is at risk of attack by nuclear and/or radioactive weapons. The USA and international community need detectors to expose these threats at the borders of the nations, airports, and sea ports. Many of the detectors currently being used are large and bulky, and not acceptable to be used as portable radiation detectors. Radiation detectors may use a gamma or neutron source in order to detect if radioactive material is present in a container, building, vehicle, etc.

Neutron interrogation techniques have specific advantages for detection of hidden, shielded, or buried threats over other detection modalities in that neutrons readily penetrate most materials, providing backscattered gammas indicative of the elemental composition of the potential threat. Such techniques have broad application to military and homeland security needs. Present neutron sources and interrogation systems are expensive and relatively bulky, thereby making widespread use of this technique impractical.

One of the concerns with explosives detection and protection is that a safe distance should be maintained. Generally, it is not desirable to approach the suspected explosive. However, to detect unknown threats remotely requires a very strong source of neutrons. Generally, neutrons cannot be focused like a laser onto a target. The further away from the unknown threat, the more neutrons need to be produced because neutrons generally spray out everywhere in an uncontrolled fashion. It is quite difficult to produce enough neutrons to interrogate objects from a distance.

The crystal driven neutron source approach has been previously demonstrated using pyroelectric crystals that generate extremely high voltages when thermal cycled. Referring to FIG. 1, a prior art schematic diagram is shown of one method of neutron interrogation. A neutron source 102 produces a neutron flux 104, with an angular neutron flux/energy distribution 106. The narrower this angular neutron flux/energy distribution 106 can be, the stronger the neutron beam impacting the unidentified threat 108 can be, thereby increasing the chances of detecting a harmful threat. Prompt and delayed gammas 112, x-rays, etc., are thrown off by the unidentified threat 108 upon contact with the neutron flux 104. These prompt and delayed gammas 112 are detected by a NaI photon detector 114 or some other type of photon detector known in the art. Each impacted gamma 116 is detected by the photon detector 114 for determining if there is a real threat, and if so, what type of threat is the unidentified threat 108. Several schemes are available for neutron-based detection, including pulsed fast neutron analysis (PFNA), thermal neutron analysis (TNA), associated particle imaging (API), etc. These schemes can identify contrabands such as explosives, drugs, radioactive material, etc., through C/N/O ratios deduced from gammas released from the target for explosives and drugs, and fission related gammas for radioactive materials.

Many current neutron-based technologies are able to penetrate metal walls, casings, soil, vehicles, and are able to propagate neutrons over distance. However, current isotropic neutron sources need significant shielding in order to operate safely, the neutron sources are generally bulky, and often require large associated equipment in order to be operated. Also, these neutron sources generally lack good directional focus, e.g., it is difficult to direct where the neutrons are being sent, thereby requiring higher neutron output to be effective. Traditionally, portable neutron sources utilizing conventional HV and Penning ion sources have a characteristic size on the order of about 30 inches and weights of up to about 60 pounds. The current neutron sources using pyroelectric or pyrofusion neutron sources do not have on/off or pulsing capability of the neutron output, and run mostly steady-state at less than about $10^3$ D-D neutrons/second (n/s), or equivalently, less than about $10^5$ D-T n/s. D-D represents a fusion reaction that can produce neutrons, with deuterium ions onto a deuterated target. D-T represents a fusion reaction that can produce neutrons, with deuterium ions onto a tritiated target. For more information on pyroelectric properties and effects, see Sidney B. Lang, "Pyroelectricity: From Ancient Curiosity to Modern Imaging Tool," Physics Today, August 2005.

The availability of a notably more intense, pulseable, lower weight, reduced power demanding, smaller neutron source using pyroelectric properties would open up new threat interrogation schemes utilizing neutron and/or gamma spectroscopy.

SUMMARY

According to one embodiment, a method for producing a neutrons includes triggering a raising or a lowering of a temperature of a pyroelectric crystal of less than about 40° C. to produce a voltage of negative polarity of at least −100 keV on a surface of a deuterated or tritiated target coupled thereto. A deuterium ion source is pulsed to produce a deuterium ion beam. The accelerating of the deuterium ion beam is achieved by accelerating voltage of the pyroelectric crystal toward the deuterated or tritiated target to produce neutrons. Furthermore, the pyroelectric crystal, the deuterated or tritiated target, and the deuterium ion source are coupled to a common support. The method also includes throwing the common support housing the pyroelectric crystal, the deuterated or tritiated target, and the deuterium ion source near an unknown threat for identification thereof.

Other aspects and embodiments of the present invention will become apparent from the following detailed description, which, when taken in conjunction with the drawings, illustrate by way of example the principles of the invention.

DETAILED DESCRIPTION

Figure 1:
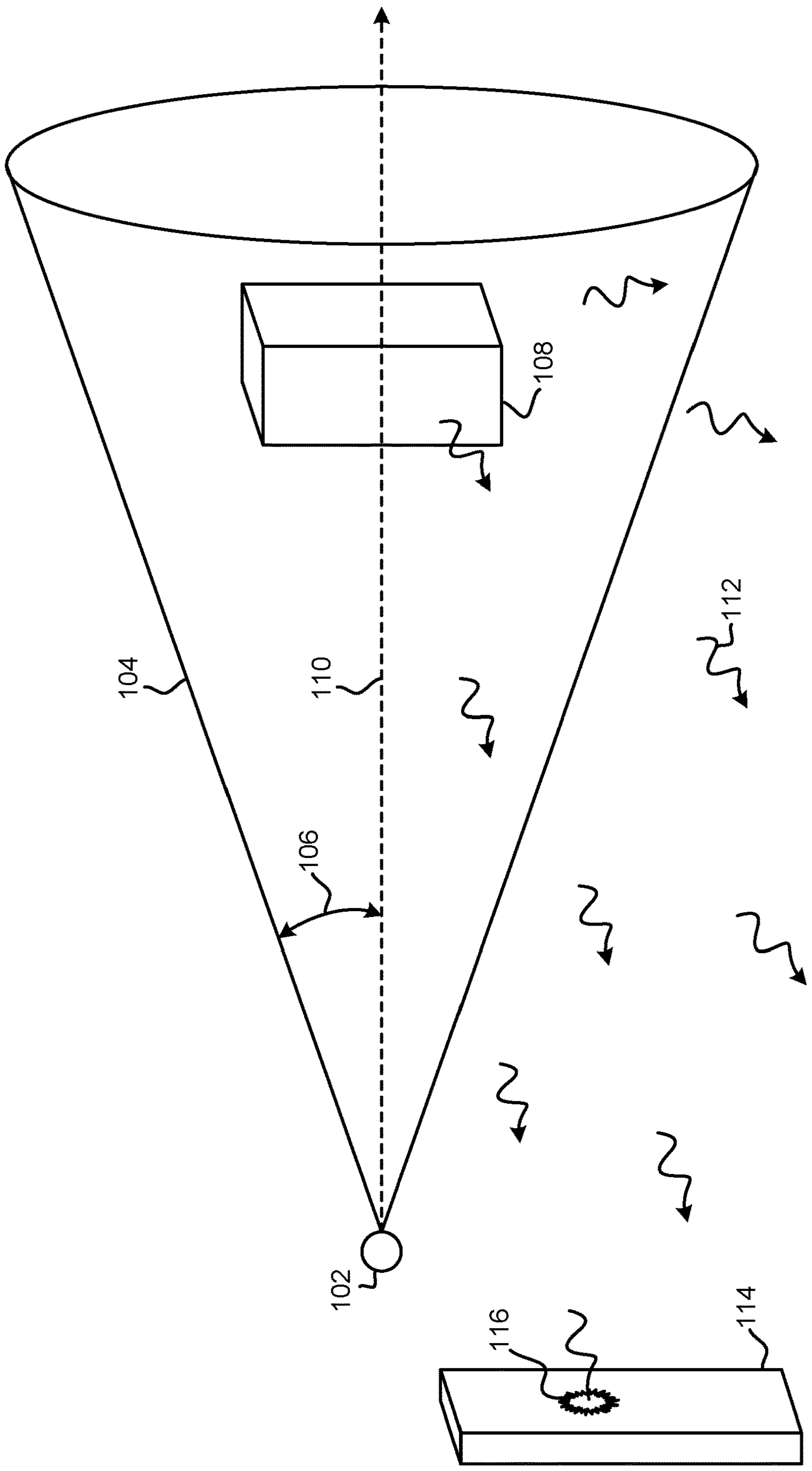
FIG. 1 (prior art)
FIG. 1 is a schematic diagram of a prior art neutron interrogation method.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" when combined with a value refers to plus and minus 10% of the reference value. For example, a temperature of about 50° C. refers to a temperature of 50° C.±5° C.

In one general embodiment, a method for producing a directed neutron beam includes producing a voltage of negative polarity of at least −100 keV on a surface of a deuterated or tritiated target in response to a temperature change of a pyroelectric crystal of less than about 40° C., the pyroelectric crystal having the deuterated or tritiated target coupled thereto, pulsing a deuterium ion source to produce a deuterium ion beam, accelerating the deuterium ion beam to the deuterated or tritiated target to produce a neutron beam, and directing the ion beam onto the deuterated or tritiated target to make neutrons using at least one of a voltage of the pyroelectric crystal, and a high gradient insulator (HGI) surrounding the pyroelectric crystal. The directionality of the neutron beam is controlled by changing the accelerating voltage of the system.

In another general embodiment, a method for producing neutrons includes triggering a raising or a lowering of a temperature of a pyroelectric crystal of less than about 40° C. to produce a voltage of negative polarity of at least −100 keV on a surface of a deuterated or tritiated target coupled thereto, where a deuterium ion source is pulsed to produce a deuterium ion beam. The deuterium ion beam is accelerated via an accelerating voltage of the pyroelectric crystal toward the deuterated or tritiated target to produce neutrons. Furthermore, the pyroelectric crystal, the deuterated or tritiated target, and the deuterium ion source are coupled to a common support. The method also includes throwing the common support housing the pyroelectric crystal, the deuterated or tritiated target, and the deuterium ion source near an unknown threat for identification thereof.

Heating and cooling of a pyroelectric crystal causes thermal stress and polarizes the crystal structure, resulting in surface charges. At less than about 100° C., internal neutralizing currents are very small. With no emission or surface currents, the charge is static. For example, $LiTaO_3$ has a pyroelectric coefficient of 190 μC/m$^2$K. For every 50° C. swing, an about 3 cm in dimension crystal has a charge (Q) of about 6.7 μC.

The following relationship, indicated as Equation 1, Equation 2, and Equation 3, is a simple one-dimensional model that shows voltage of up to about 200 keV for a ΔT of 50K and a 1 cm.×3 cm. crystal.

$$V = \frac{Q}{\frac{\varepsilon_{cr} A}{d_{cr}} + \frac{\varepsilon_0 A}{d_v}} \qquad \text{Equation 1}$$

Where V is the voltage, A is the area of the crystal surface, Q is the charge, $d_{cr}$ is the thickness of the crystal, and $d_v$ is the distance between the charged surface of the crystal and the equivalent ground. The voltage depends on the crystal capacitance ($\varepsilon_{cr}$) and the vacuum capacitance ($\varepsilon_0$). The crystal capacitance dominates this relationship, since the crystal capacitance is about 46 times the vacuum capacitance.

Figure 2A:
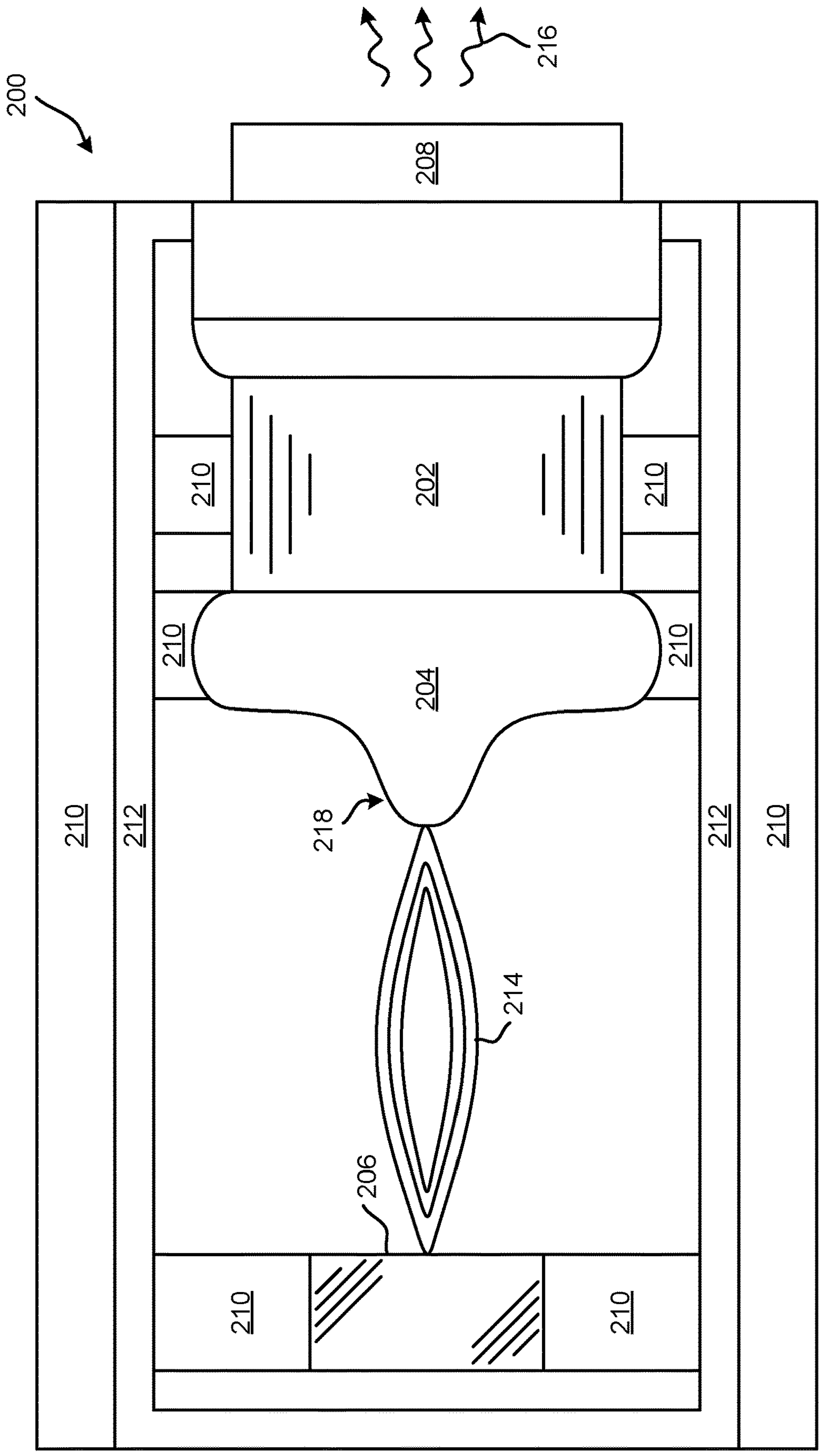
FIG. 2A is a schematic diagram of an apparatus for producing neutrons, according to one embodiment.

Now referring to FIG. 2A, a pulseable pyroelectric crystal driven neutron source (PCDNS) 200 is shown according to one embodiment. The PCDNS 200 includes a pyroelectric crystal 202, a deuterated or tritiated target 204, an ion source 206, and a common support 210 coupled to the pyroelectric crystal 202, the deuterated or tritiated target 204, and the ion source 206. The common support 210 may be comprised of one or more parts, and may support more than the pyroelectric crystal 202, the deuterated or tritiated target 204, and the ion source 206.

According to one embodiment, the pyroelectric crystal 202 may be formed of a material selected from a group consisting of: lithium tantalite, lithium niobate, and barium strontiate. Of course, other pyroelectric crystal materials known in the art may also be used. In addition, any pyroelectric material capable of withstanding the temperature fluctuations and stress exerted on the material in order to produce high voltages on a surface may also be used in addition to crystal materials.

In some approaches, the support 210 may be a hollow tube having first and second ends. The ion source 206 may be near the first end, the pyroelectric crystal 202 may be near the second end, and the target 204 may be positioned between the ion source 206 and the pyroelectric crystal 202. The support 210 may have a circular, oval, triangular, rectangular, (e.g., polygonal) cross section, or may have any other shape such that the pyroelectric crystal 202 may be thermally cycled by an optional thermal altering mechanism 208 while still shielding the pyroelectric crystal 202, the deuterated or tritiated target 204, and the ion source 206 so as not to produce stray neutrons 216 or electrical shocks.

In more approaches, the support 210 may be a vacuum tube maintaining at least a partial vacuum therein. In this approach, the pyroelectric crystal 202, the deuterated or tritiated target 204, and the ion source 206 may be housed within the vacuum tube, while other components of the PCDNS 200 may be internal or external of the vacuum tube.

Figure 2B:
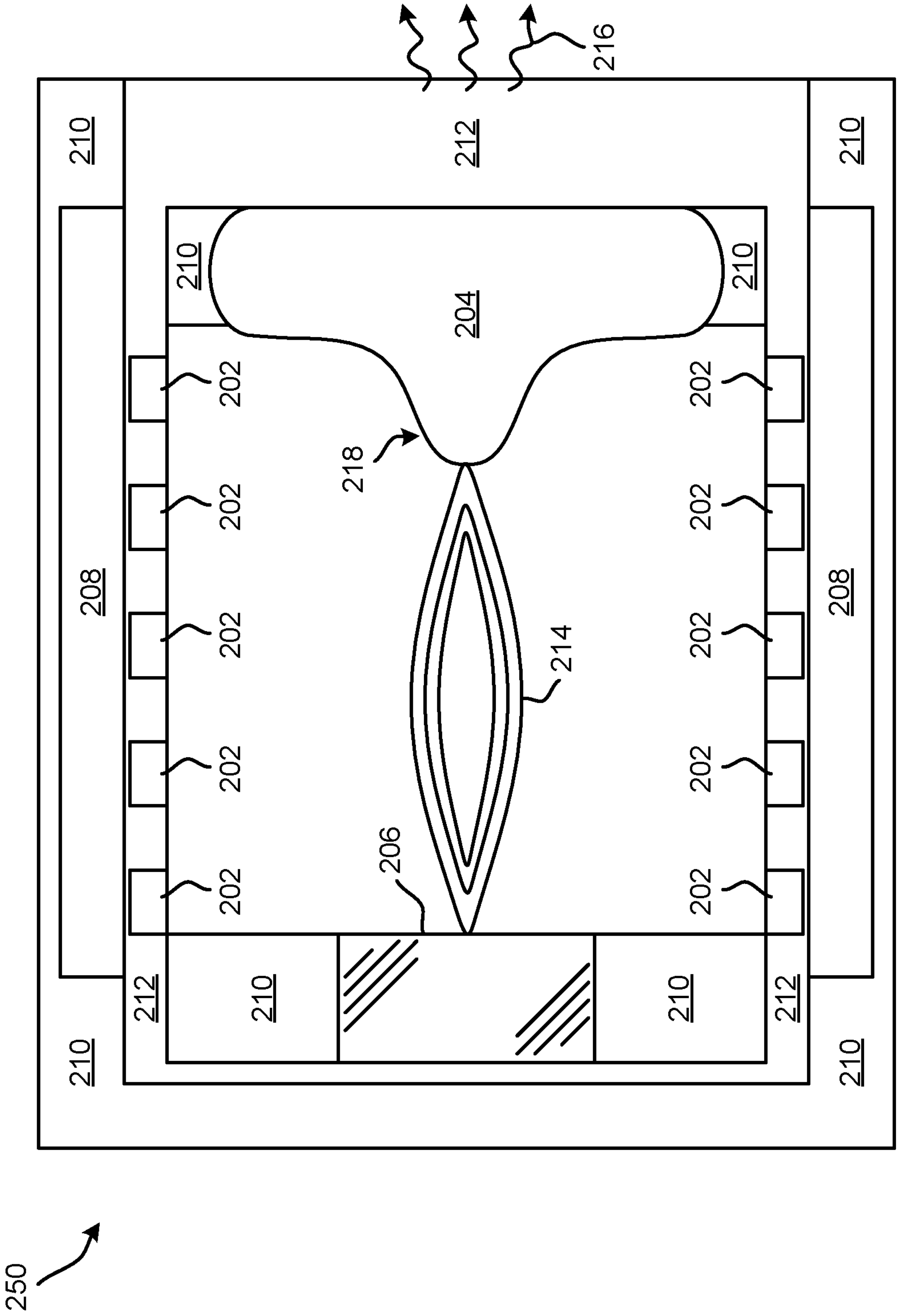
FIG. 2B is a schematic diagram of an apparatus for producing neutrons, according to another embodiment.

According to one embodiment, the PCDNS 200 may further include an ion accelerating mechanism (not shown), such as a pyroelectric stack accelerator (as shown in FIG. 2B), including a second thermal altering mechanism for changing a temperature of the pyroelectric stack accelerator. Referring again with FIG. 2A, the pyroelectric stack accelerator may comprise a hollow accelerating column in between the target 204 and ion source 206 made up of high gradient insulator (HGI) and one or more pyroelectric crystals providing accelerating potential for an ion beam from the ion source 206.

Also, according to some embodiments, the PCDNS 200 may further include a high gradient insulator (HGI) 212 surrounding the pyroelectric crystal 202, the ion accelerating mechanism, and the deuterated or tritiated target 204. The HGI 212 may be comprised of alternating layers of conductors and insulators with periods less than about 1 mm. These structures generally perform many times better (about 1.5 to 4 times higher breakdown electric field) than conventional insulators in long pulse, short pulse, and alternating polarity applications.

According to some embodiments, the ion source 206 may be deuterated such that the ion source 206 produces a deuterium ion beam 214 when pulsed, e.g., pulsed with high voltage. In addition, in some preferred embodiments, the ion source 206 may be a pulseable ion source comprised of at least one of: a cold cathode gated nanotip array, a nanotube ion source, and a spark source.

Once a negative high voltage is produced on the pyrocrystal 202, which causes the deuterated or tritiated target 204 to achieve a negative high voltage on a surface of the deuterated or tritiated target 204, an ion beam of deuterium that impacts this target is produced. The ion source 206 produces these ions. (The ions produced by the ion source 206 may be at low energy (e.g., less than 100 keV). The field provided by the pyrocrystal 202 may accelerate the ions to at least 100 keV. This acceleration of the ion beam will ultimately cause the neutrons 216, which are a desired effect of the PCDNS 200, according to one embodiment.

A gated nanotip array may be described, according to one embodiment, on a MEM scale, where sharp to very sharp tips are produced and biased by a positive voltage, which may be from about 100 V to about 500 V. Around these tips, a separate electrode is placed. These can be visualized as little volcanoes with a metal wire protruding from the center of the volcano's crater. In the volcano, the tip is the positive voltage, and the ring of the crater of the volcano may be at ground. If the voltage rises high enough, the device makes ions. If the gated nanotip array is in a deuterium atmosphere, or is deuterated, the ions will be deuterium ions. If the gated nanotip array is in a tritium atmosphere, or is tritiated, the ions will be tritium ions. The gas surrounding the gated nanotip array will ionize and produce ions that may be directed into an ion beam. In some cases, it is preferable to use the nanotip array in a deuterium or tritium gas. However, in other embodiments, the tips may be deuterated (e.g., the tips may be comprised of titanium, magnesium, platinum, etc., and then deuterated or tritiated to form a metal hydride), but the gas is trapped in the tip and a source of electrons may free these ions. In other approaches, the tips are deuterated or tritiated such that the hydrogen is absorbed on the surface of the tips. Approximately 10,000 to 100,000 or more gated nanotips may comprise an array, according to some embodiments. They may be formed on a common substrate or on separate substrates, and then incorporated into the PCDNS 200.

A nanotube ion source may be described, according to one embodiment, as a plurality of vertically aligned nanotubes arranged on a mat or substrate (e.g., a nanotube array), in which the grounded metal is placed above each nanotube. A grid (e.g., a very fine mesh) that is grounded may be placed almost at the top of the nanotube array (about 45 μm to about 100 μm away, depending on the voltage desired), and basically the same ionization processes that occurs with the gated nanotip array occurs when the nanotubes are biased (either positively or negatively), e.g., a gas becomes ionized. The nanotubes are generally made of carbon, possibly with some additional components.

A spark source may be described, according to one embodiment, as a breakdown between two electrodes. For example, two strips may be placed parallel to one another, and the gap between these strips determines how much voltage may be produced. The strips may be deuterated or tritiated titanium, magnesium, platinum, etc. If a sufficient amount of voltage is applied between the strips (e.g., about 2-10 kV), a spark forms between the two strips. When the spark forms, the deuterium or tritium is liberated from the metal, and subsequently becomes ionized in the spark, thereby producing ions. The spark source may be operated without any specific gas present, since the deuterium or tritium exists in the metal itself. Therefore, the spark source may be operated in a partial or nearly ideal vacuum. The spark source may also produce a very short pulse, in some embodiments about 25 ns.

According to some embodiments, the spark source may be powered by a RLC circuit (e.g., a circuit comprising a resistor, an inductor, and a capacitor).

In some approaches, the thermal altering mechanism 208 for changing a temperature of the pyroelectric crystal 202 may be at least one of: a chemical heating pack, a chemical cooling pack, a Peltier heater/cooler, a thermite composition, a resistive heating element, a dielectric fluid system, and a thermoelectric heater/cooler. Also, the thermal altering mechanism 208 may raise or lower a temperature of the pyroelectric crystal 202 by about 10° C. to about 150° C. to produce a voltage of negative polarity on a surface of the deuterated or tritiated target 204 of at least about −100 keV. In some preferred embodiments, the thermal altering mechanism 208 may raise or lower a temperature of the pyroelectric crystal 202 by less than about 40° C. to produce a voltage of negative polarity on a surface of the deuterated or tritiated target 204 of at least about −100 keV.

In some more preferred embodiments, a temperature of the pyroelectric crystal 202 may be raised or lowered by at least about 30° C. (e.g., about 35° C., about 40° C., about 50° C., etc.), and the change in temperature may be determined based on a desired voltage, strength of ion beam, amount of gammas produced, etc., and a characteristic of the pyroelectric crystal to produce charge.

The deuterated or tritiated target 204, in some preferred embodiments, may at least partially cover at least one side of the pyroelectric crystal 202. In more embodiments, the deuterated or tritiated target 204 may at least partially cover the pyroelectric crystal 202 on more than one side, may be placed directly adjacent the pyroelectric crystal 202, etc.

In some approaches, the deuterated or tritiated target 204 may have an inverted cone geometry with a beam focusing tip 218 extending toward the ion source 206. Of course, any other geometry which allows the target to sufficiently focus the produced ion beam 214 may be used.

In preferred embodiments, the PCDNS 200 may produce neutrons at a rate of about $10^6$ D-T n/s or about $10^4$ D-D n/s. In addition, the PCDNS 200 may weigh less than about 10 lb., possibly about 5 lb., and be small enough to be held in a person's hand. In some other embodiments, the PCDNS 200 may be placed on a radio controlled vehicle (such as an R/C model car) for positioning close to a possibly dangerous, unknown threat, without exposing persons to a possibility of harm.

Now referring to FIG. 2B, an apparatus 250 for producing neutrons 216 is shown according to one embodiment. The apparatus may be in a shape of a hollow tube, according to one embodiment. Of course, this tube may have any desired cross section, such as circular, oval, rectangular, triangular, etc. In this embodiment, the pyroelectric crystal 202 comprises a portion of a pyroelectric stack accelerator. The pyroelectric stack accelerator comprises the pyroelectric crystal 202 formed in a plurality of hollow portions alternating and partially shrouded with high gradient insulator (HGI) portions 212, wherein a thermal altering mechanism 208 changes a temperature of the pyroelectric crystal(s) 202. In this embodiment, the pyroelectric crystal 202 may accelerate the ions 214 onto the target 204 to produce neutrons 216.

According to one embodiment, a compact pulseable crystal driven neutron source (PCDNS) is described. This PCDNS is a palm-sized neutron source capable of greater than about $10^6$ D-T neutrons/second (n/s) or about $10^4$ D-D n/s with a weight of less than about 10 lb. The device includes a small (about 3-5 cm. width and depth by about 1-2 cm. thickness) pyroelectric crystal, e.g., lithium tantalate, which is covered with either a deuterated or tritiated target and is thermally cycled to produced negative high voltages of greater than about −100 kV on its surface, and a small (about 1 cm. scale) independently controlled deuterium ion source, such as a spark source, a nanotube source, a cold cathode gated nanotip source, etc., which can be pulsed to produce deuterium ion beams that are accelerated onto the negative HV crystal surface/target to produce neutrons. If desired, a high gradient insulator (HGI) accelerator tube can be used to insulate the high voltage from an external ground.

In some embodiments, the ion sources typically use less than about 1 keV and about 1 W of power, both of which can be easily provided by a compact source. The crystal can be thermal cycled at a range of speeds (about 10 sec. to about 200 sec.) using conventional heating and/or cooling mechanisms, such as chemical packs (e.g., hand warmers commercially available), dielectric heaters, a thermite composition, etc. In some approaches, the entire apparatus may be in a sealed vacuum tube, with the heating/cooling mechanisms applied external of the vacuum tube. Alternatively, another novel approach which provides significantly faster thermal cycling and greater voltages is to quench the crystal/setup in an insulating dielectric fluid, such as fluorinert. The fluid serves as both high voltage insulation and as a thermal exchange medium, and has thermal cycling times (indicated as pulses) with the crystal on the order of about 1 sec to 100 sec.

Figure 3:
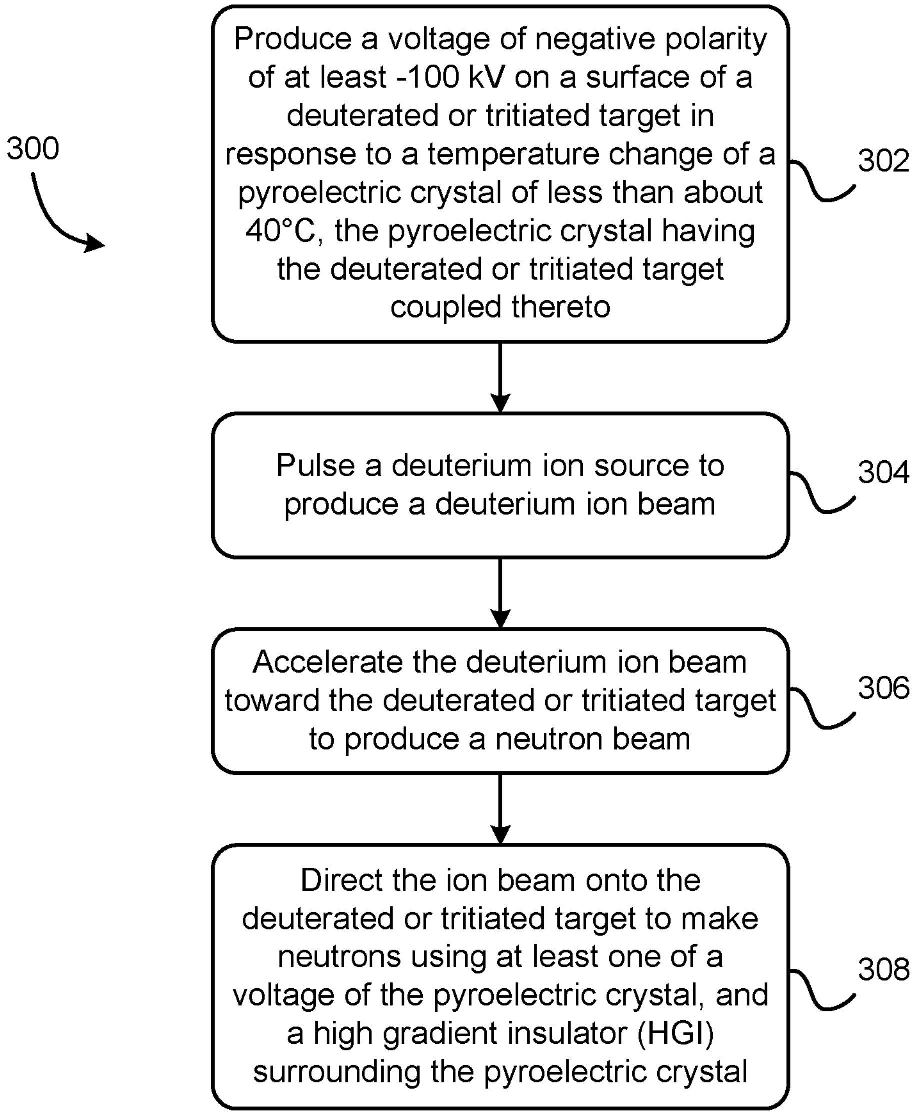
FIG. 3 is a flowchart of a method for producing neutrons, according to one embodiment.

Now referring to FIG. 3, a method 300 is shown according to one embodiment. The method may be carried out in any desired environment, and the description of method 300 may include any of the details and descriptions provided for FIGS. 1-2 above.

In operation 302, a voltage is produced of negative polarity of at least −100 keV on a surface of a deuterated or tritiated target in response to a temperature change of a pyroelectric crystal of less than about 40° C., the pyroelectric crystal having the deuterated or tritiated target coupled thereto.

According to some embodiments, the pyroelectric crystal may be formed of a material selected from a group consisting of: lithium tantalite, lithium niobate, and barium strontiate. Of course, other pyroelectric crystals may be used that are known in the art.

In some approaches, the temperature change of the pyroelectric crystal may be at least partially caused by at least one of: a chemical heating pack, a chemical cooling pack, a Peltier heater/cooler, a thermite composition, a resistive heating element, a dielectric fluid system, and a thermoelectric heater/cooler. To that end, the thermal altering mechanism may include one or more of the foregoing.

Also, according to some embodiments, the deuterated or tritiated target may cover at least a portion of at least one side of the pyroelectric crystal. In addition, the deuterated or tritiated target may have an inverted cone geometry with a focusing tip extending toward the deuterium ion source.

In operation 304, a deuterium ion source is pulsed to produce a deuterium ion beam. In some approaches, the deuterium ion source may include at least one of: a cold cathode gated nanotip array, a nanotube ion source, and a spark source, as described above in relation to FIGS. 2A-2B.

In operation 306, the deuterium ion beam is accelerated toward the deuterated or tritiated target to produce a neutron beam. According to some approaches, accelerating the deuterium ion beam may be achieved by using an ion accelerating mechanism, which includes a pyroelectric stack accelerator having a thermal altering mechanism for changing the temperature of the pyroelectric stack accelerator.

In operation 308, the ion beam is directed using a high gradient insulator (HGI) surrounding the pyroelectric crystal and the ion accelerating pyroelectric stack accelerator, and onto the deuterated or tritiated target to make directional neutrons.

Another method for producing neutrons may comprise triggering a raising or a lowering of a temperature of a pyroelectric crystal of less than about 40° C. to produce a voltage of negative polarity of at least −100 keV on a surface of a deuterated or tritiated target coupled thereto. A deuterium ion source may be pulsed to produce a deuterium ion beam, and the deuterium ion beam may be accelerated via an ion accelerating pyroelectric stack accelerator toward the deuterated or tritiated target to produce neutrons. Also, the pyroelectric crystal, the ion accelerating pyroelectric stack accelerator, the deuterated or tritiated target, and the deuterium ion source may be coupled to a common support. The method may further comprise throwing, placing, positioning, moving or otherwise providing the common support housing the pyroelectric crystal, the ion accelerating pyroelectric stack accelerator, the deuterated or tritiated target, and the deuterium ion source near an unknown threat for identification thereof.

Many of the embodiments disclosed herein may be useful for providing a pulseable crystal driven neutron source (PCDNS) that may be a compact and rugged source of fast neutrons via D-D and D-T reactions, which could be used for active cargo interrogation for special nuclear materials (SNM), neutron radiography, and explosives detection, via various interrogation schemes such as pulse fast neutron analysis (PFNA) or Associated Particle Imaging (API). Because of its compactness and small weight, the PCDNS could enable new active neutron/gamma interrogation schemes where the neutron source is thrown or remotely positioned up to a target of interest, increasing significantly the signal to background of the returned gamma signal.

Additionally, the PCDNS may be useful as a calibration source, and may be employed anywhere where extremely portable neutron sources using none or very little battery power are required. This might entail soldiers, inspectors, technicians, engineers, etc., out in the field that wish to do active interrogation of threats or materials via neutron/gamma spectroscopy.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for producing neutrons for enabling identification of a threat, the method comprising:

triggering a raising or a lowering of a temperature of a pyroelectric crystal of less than about 40° C. to produce a voltage of negative polarity of at least −100 keV on a surface of a deuterated or tritiated target coupled thereto, wherein a deuterium ion source is pulsed with the voltage to produce a deuterium ion beam, wherein the deuterium ion beam is accelerated via an electric field provided by the pyroelectric crystal toward the deuterated or tritiated target to produce neutrons, wherein the pyroelectric crystal, the deuterated or tritiated target, and the deuterium ion source are coupled to a common support; and positioning the common support coupled to the pyroelectric crystal, the deuterated or tritiated target, and the deuterium ion source toward the threat for enabling the identification of the threat.

2. The method of claim 1, wherein the pyroelectric crystal is formed of a material selected from the group consisting of: lithium tantalite, lithium niobate, and barium strontiate.

3. The method of claim 1, wherein the common support includes a hollow tube having first and second ends positioned opposite one another, wherein the deuterium ion source is toward the first end, the pyroelectric crystal is toward the second end, and the deuterated or tritiated target is positioned between the ion source and the pyroelectric crystal.

4. The method of claim 3, wherein the hollow tube is a vacuum tube maintaining a partial vacuum therein.

5. The method of claim 1, wherein the accelerated deuterium ion beam is achieved by using an ion accelerating mechanism comprising a pyroelectric stack accelerator having a thermal altering mechanism for the raising or the lowering of the temperature of the pyroelectric stack accelerator.

6. The method of claim 1, wherein the raising or the lowering of the temperature of the pyroelectric crystal is at least partially caused by at least one mechanism selected from the group consisting of: a chemical heating pack, a chemical cooling pack, a Peltier heater/cooler, a thermite composition, a resistive heating element, a dielectric fluid system, and a thermoelectric heater/cooler.

7. The method of claim 1, wherein the deuterated or tritiated target covers at least a portion of at least one side of the pyroelectric crystal.

* * * * *